(12) United States Patent
Stamatescu et al.

(10) Patent No.: US 8,159,225 B2
(45) Date of Patent: Apr. 17, 2012

(54) MULTI-FREQUENCY TRANSMITTER FOR A METAL DETECTOR

(75) Inventors: Laurentiu Stamatescu, Rostrevor (AU); Oliver Nesper, Plympton (AU)

(73) Assignee: Minelab Electronics Pty Ltd (AU)

( * ) Notice: Subject to any disclaimer, the term of this patent is extended or adjusted under 35 U.S.C. 154(b) by 324 days.

(21) Appl. No.: 12/490,164

(22) Filed: Jun. 23, 2009

(65) Prior Publication Data

US 2009/0318098 A1    Dec. 24, 2009

(30) Foreign Application Priority Data

Jun. 23, 2008 (AU) ................................ 2008903172

(51) Int. Cl.
 *G01V 3/08* (2006.01)
(52) U.S. Cl. .................... 324/326; 324/329; 324/345
(58) Field of Classification Search ........... 324/323–345
See application file for complete search history.

(56) References Cited

U.S. PATENT DOCUMENTS 4,311,929 A    1/1982 Konrad et al.

FOREIGN PATENT DOCUMENTS

GB    2 423 366 A    8/2006
WO    WO 2006/021045 A1    3/2006

*Primary Examiner* — Arleen M Vazquez
(74) *Attorney, Agent, or Firm* — Beyer Law Group LLP

(57) ABSTRACT

A method for generating a transmit signal for transmission including the steps of a) generating at least two selected rectangular wave signals, each having a different fundamental frequency; b) mixing the selected rectangular wave signals to produce a driving signal; and c) driving a switching circuit using the driving signal for generating a transmit signal for transmission, wherein the Fourier transform of the transmit signal contains frequency components of relatively high magnitude, at frequencies corresponding to the convolution of the fundamental frequencies of the said at least two selected rectangular wave signals, as compared to other frequency components across the frequency spectrum of the Fourier transform, and wherein the rectangular wave signals are selected such that the frequency components of relatively high magnitude are substantially the same in magnitude, and spaced from each other in the frequency spectrum in a predetermined manner.

15 Claims, 7 Drawing Sheets

MULTI-FREQUENCY TRANSMITTER FOR A METAL DETECTOR

TECHNICAL FIELD

The current invention relates to multi-frequency switching transmitters for metal detectors using half-bridge or full-bridge topologies.

BACKGROUND ART

Continuous wave multiple frequency metal detectors have significant advantages over their single frequency counterparts in terms of ground rejection and target discrimination. They also have significant advantages over the pulse induction detectors in terms of target sensitivity and target discrimination. However, for these advantages to be realised, it is essential that the simultaneous transmission at several frequencies is done accurately and efficiently.

Some preferred requirements of a good multi-frequency transmitter are to have high efficiency, to be constructively simple and of low cost, to maximise the power transmitted at the required frequencies and to minimise the power transmitted at any other frequencies. In addition, the ability to independently change any of the transmitted frequencies, to keep the transmitted signals at comparable amplitudes, and to employ simple means to generate the signals to be transmitted is also desirable.

For optimum operation of the metal detector, a good selection of the nominal values of the transmitted frequencies is required. It is known that a linear progression on a logarithmic frequency scale (or a geometric progression on a linear frequency scale) is a good choice because for both targets and grounds, relevant features can be best observed on a logarithmic frequency scale. For good target discrimination and good rejection of ground signals it is desirable to have as many frequencies as possible. However, for a given amount of transmitted power, the more frequencies are used, the less power is transmitted on each frequency. At the same time, the amount of noise received is proportional with the number of frequencies used; therefore the signal-to-noise ratio decreases with increasing the number of frequencies. It was found that using four to eight frequencies gives a good compromise between detection depth (sensitivity) and target discrimination while being able to reject soils that are both magnetic and conductive.

If the detector uses digitally intensive techniques, as described for example in WO2006/021045, then there are a number of alternatives that can be used to achieve efficient multi-frequency transmission, including for example, a class B (or AB) amplifier in conjunction with tuned circuits, a class D (switching) amplifier driving the transmit winding directly, a switching (square or rectangular) wave transmitter driving the transmit winding directly, etc. Each alternative has advantages and disadvantages.

For example, the class B (or AB) amplifier in conjunction with tuned circuits compensates the lack of efficiency of the linear amplifier with the recirculation of the current offered by the tuned circuit. While constructively simple, this approach has the drawback that the operating frequencies must be matched to the resonant frequencies of the tuned circuit, which are determined by the circuit elements (inductors and capacitors) and therefore susceptible to accuracy and drift issues. This also limits the ability to vary the operating frequencies around their nominal values, which is at times necessary for avoiding external interference. Additionally, changes in the inductance of the transmit winding due to ground mineralisation produce significant phase shifts between the excitation and the resultant current, requiring greater accuracy for amplitude and phase corrections. If the driving frequencies are generated digitally, the cost of this solution is increased by the need to provide one or more digital-to-analogue converters (DAC). An advantage of this solution is that, if the amplifier and the DAC (if required) have reasonably low distortion, the transmitted signals are spectrally clean, owing to the filtering effect of the tuned circuit.

The solution based on the class D (switching) amplifier theoretically comes close to the ideal: high efficiency, flexibility in the choice of the operating frequencies (no restrictions due to tuned circuits), and low distortion. A class D amplifier can have either analogue or digital input. In the analogue input case it might require a DAC (if the transmitted signals are generated digitally) and its construction is more complicated, but can achieve relatively low distortion. In the digital input case, the construction is simpler, but the amplitude resolution is limited, causing distortion and in-band spurious signals. In both cases the output low pass filter (reconstruction filter) is a critical circuit element, as it can introduce frequency dependent amplitude and phase variations. The filter also controls the amount of switching frequency, its harmonics and spurious signals leaking into the transmit winding and further on into the receive winding and receive circuit. The compromise between desirable amplitude and phase versus frequency characteristics and switching frequency suppression depends on the damping of the low pass filter, which introduces losses. These losses are in addition to those inherent to the switching action of the power stage. When these variables are taken into account, the class D amplifier is not as attractive as it initially appears.

On the other hand, switching transmitters for metal detectors are known to have many desirable characteristics, like simple construction, low power dissipation and relatively low electromagnetic compatibility issues. Most of them transmit a repetitive multi-period waveform which has the property that its fundamental and/or some of its harmonics have higher magnitude. However, with such waveforms, it is relatively difficult to insure that strong Fourier transform components of comparable magnitude only occur at a few selected frequencies and that all other harmonics have low magnitude. Also, the frequencies used in operation must be integer multiples of the fundamental, which can be limiting at times.

There are examples in the prior art, like UK patent application GB 2 423 366 A and many others where two signals with the same frequency but different phases and/or duty cycle are applied to the inputs of two half-bridge amplifiers, whose outputs are in turn connected the load. This arrangement generates a 3 level waveform with reduced amount of energy at higher frequency harmonics. Obviously, this is an improvement, but single frequency operation is inadequate for high performance metal detection. In the U.S. Pat. No. 4,311,929, the two independent half-bridge switching amplifiers are driven with two signals with different frequencies, effectively summing the two signals across the load. This also generates a three level waveform, but the patent does not extend the method to more than two frequencies.

The current invention provides a switching transmitter of a new and novel configuration that overcomes or at least substantially ameliorates the problems associated with existing transmitters for metal detectors.

SUMMARY OF INVENTION

In a first broad aspect of the invention there is provided a method for generating a transmit signal for transmission including the steps of:

a) generating at least two selected rectangular wave signals, each having a different fundamental frequency;

b) mixing the selected rectangular wave signals to produce a driving signal; and c) driving a switching circuit using the driving signal for generating a transmit signal for transmission, wherein the Fourier transform of the transmit signal contains frequency components of relatively high magnitude, at frequencies corresponding to the convolution of the fundamental frequencies of the said at least two selected rectangular wave signals, as compared to other frequency components across the frequency spectrum of the Fourier transform, and wherein the rectangular wave signals are selected such that the frequency components of relatively high magnitude are substantially the same in magnitude, and spaced from each other in the frequency spectrum in a predetermined manner.

In one form, the switching circuit is a half-bridge or a full-bridge, the full-bridge including two inputs, a first input for receiving the driving signal, and a second input for receiving the inverted said driving signal; and wherein the selected rectangular wave signals include:

a first signal having a first fundamental frequency $f_A$;

a second signal having a second fundamental frequency $f_B$; and a third signal having a third fundamental frequency $f_C$; wherein the convolution of the fundamental frequencies generates four frequency components of relatively high magnitude at frequencies $f_1$, $f_2$, $f_3$ and $f_4$, and the four frequency components are substantially linearly-spaced in a logarithmic scaled frequency spectrum.

In one form, the fundamental frequencies are substantially determined through the relationship of $$f_A = \frac{k+1}{2} f_1,$$

$$f_B = \frac{k^2+1}{2} f_1,$$

and $$f_C = \frac{k(k+1)}{2} f_1,$$

where k is the tribonacci constant, and $f_1$ is the lowest frequency among $f_1$, $f_2$, $f_3$ and $f_4$.

In a second broad aspect of the invention there is provided a method for generating transmit signals for transmission including the steps of:

a) generating a first group of at least two selected rectangular wave signals, and a second group of at least two selected rectangular wave signals, each rectangular wave signal having a different fundamental frequency;

b) mixing the first group to produce a first driving signal, and the second group to produce a second driving signal; and c) driving a first half-bridge using the first driving signal for generating a first transmit signal, wherein the Fourier transform of the first transmit signal contains frequency components of relatively high magnitude, at frequencies corresponding to the convolution of the fundamental frequencies of the first group, as compared to other frequency components across the frequency spectrum of the Fourier transform, and driving a second half bridge using the second driving signal for generating a second transmit signal, wherein the Fourier transform of the second transmit signal contains frequency components of relatively high magnitude, at frequencies corresponding to the convolution of the fundamental frequencies of the second group, as compared to other frequency components across the frequency spectrum of the Fourier transform, and wherein the rectangular wave signals are selected such that the frequency components of relatively high magnitude are substantially the same in magnitude, and spaced from each other in the frequency spectrum in a predetermined manner.

In a form of the second broad aspect of the invention, the first group includes:

a first signal having a first fundamental frequency $f_A$; and a second signal having a second fundamental frequency $f_B$;

the second group includes:

a third signal having a third fundamental frequency $f_C$; and a fourth signal having a fourth fundamental frequency $f_D$;

and wherein the convolution of the first and second fundamental frequencies generates two frequency components of relatively high magnitude at frequencies $f_1$ and $f_2$; and the convolution of the third and fourth fundamental frequencies generates two frequency components of relatively high magnitude at frequencies $f_3$ and $f_4$, and all four frequency components are substantially linearly-spaced in a logarithmic scaled frequency spectrum;

and wherein the fundamental frequencies are substantially determined through the relationship of $$f_A = \frac{k-1}{2} f_1,$$

$$f_B = \frac{k+1}{2} f_1,$$

$$f_C = \frac{k^2(k-1)}{2} f_1,$$

and $$f_D = \frac{k^2(k+1)}{2} f_1,$$

where k is any numerical value, and $f_1$ is the lowest frequency among $f_1$, $f_2$, $f_3$ and $f_4$.

In a form of the second broad aspect of the invention, the first group includes:

a first signal having a first fundamental frequency $f_A$; and a second signal having a second fundamental frequency $f_B$;

the second group includes:

a third signal having a third fundamental frequency $f_C$; and a fourth signal having a fourth fundamental frequency $f_D$;

and wherein the convolution of the first and second fundamental frequencies generates two frequency components of relatively high magnitude at frequencies $f_2$ and $f_3$; and the convolution of the third and fourth fundamental frequencies generates two frequency components of relatively high magnitude at frequencies $f_1$ and $f_4$, and all four frequency components are substantially linearly-spaced in a logarithmic scaled frequency spectrum;

and wherein the fundamental frequencies are substantially determined through the relationship of $$f_A = \frac{k(k-1)}{2} f_1,$$

$$f_B = \frac{k(k+1)}{2} f_1,$$

$$f_C = \frac{k^3-1}{2} f_1,$$

and $$f_D = \frac{k^3+1}{2} f_1,$$

where k is any numerical value, and $f_1$ is the lowest frequency among $f_1$, $f_2$, $f_3$ and $f_4$.

In a form of the second broad aspect of the invention, the first group includes:
a first signal having a first fundamental frequency $f_A$; and
a second signal having a second fundamental frequency $f_B$;
the second group includes:
a third signal having a third fundamental frequency $f_C$; and
a fourth signal having a fourth fundamental frequency $f_D$;
and wherein the convolution of the first and second fundamental frequencies generates two frequency components of relatively high magnitude at frequencies $f_1$ and $f_3$; and the convolution of the third and fourth fundamental frequencies generates two frequency components of relatively high magnitude at frequencies $f_2$ and $f_4$, and all four frequency components are substantially linearly-spaced in a logarithmic scaled frequency spectrum;
and wherein the fundamental frequencies are substantially determined through the relationship of $$f_A = \frac{k^2 - 1}{2} f_1,$$

$$f_B = \frac{k^2 + 1}{2} f_1,$$

$$f_C = \frac{k(k^2 - 1)}{2} f_1,$$

and $$f_D = \frac{k(k^2 + 1)}{2} f_1,$$

where k is any numerical value, and $f_1$ is the lowest frequency among $f_1$, $f_2$, $f_3$ and $f_4$.

In a form of the second broad aspect of the invention, the first group includes:
a first signal having a first fundamental frequency $f_A$;
a second signal having a second fundamental frequency $f_B$; and
a third signal having a third fundamental frequency $f_C$;
the second group includes:
a fourth signal having a fourth fundamental frequency $f_D$;
a fifth signal having a fifth fundamental frequency $f_E$; and
a sixth signal having a sixth fundamental frequency $f_F$;
and wherein the convolution of the first, second and third fundamental frequencies generates four frequency components of relatively high magnitude at four different frequencies; and the convolution of the fourth, fifth and sixth fundamental frequencies generates four frequency components of relatively high magnitude at four other frequencies, and all eight frequency components are substantially linearly-spaced in a logarithmic scaled frequency spectrum.

In a form of the second broad aspect of the invention, the first group includes:
a first signal having a first fundamental frequency $f_A$;
a second signal having a second fundamental frequency $f_B$; and
a third signal having a third fundamental frequency $f_C$;
the second group includes:
a fourth signal having a fourth fundamental frequency $f_D$; and
a fifth signal having a fifth fundamental frequency $f_E$;
and wherein the convolution of the first, second and third fundamental frequencies generates four frequency components of relatively high magnitude at four different frequencies; and the convolution of the fourth and fifth fundamental frequencies generates two frequency components of relatively high magnitude at two other frequencies, and all six frequency components are substantially linearly-spaced in a logarithmic scaled frequency spectrum.

In a third broad aspect of the invention there is provided an apparatus for generating a transmit signal for transmission including
at least one generator to generate at least two selected rectangular wave signals, each rectangular wave signal having a different fundamental frequency;
at least one mixer to mix the selected rectangular wave signals to produce a driving signal; and
at least one switching circuit for receiving the driving signal to generate a transmit signal for transmission, wherein the Fourier transform of the transmit signal contains frequency components of relatively high magnitude at frequencies corresponding to the convolution of the fundamental frequencies of the at least two selected rectangular wave signals as compared to other frequency components across the frequency spectrum of the Fourier transform, and wherein the rectangular wave signals are selected such that the frequency components of relatively high magnitude are substantially the same in magnitude, and spaced from each other in the frequency spectrum in a predetermined manner.

In a fourth broad aspect of the invention there is provided a metal detector used for detecting metallic targets including:
a) transmit electronics having a plurality of switches for generating a transmit signal;
b) a transmit coil connected to the transmit electronics for receiving the transmit signal and generating a transmitted magnetic field for transmission;
c) at least one receive coil for receiving a received magnetic field and providing a received signal induced by the received magnetic field; and
d) receive electronics connected to the at least one receive coil for processing the received signal to produce an indicator output signal, the indicator output signal including a signal indicative of the presence of a metallic target in the soil;
wherein the transmit electronics generates at least two selected rectangular wave signals, each having a different fundamental frequency; the transmit electronics further mixes the selected rectangular wave signals to produce a driving signal for driving a switching circuit to generate transmit signal for transmission, the Fourier transform of the transmit signal contains frequency components of relatively high magnitude, at frequencies corresponding to the convolution of the fundamental frequencies of the at least two selected rectangular wave signals, as compared to other frequency components across the frequency spectrum of the Fourier transform, and wherein the rectangular wave signals are selected such that the frequency components of relatively high magnitude are substantially the same in magnitude, and spaced from each other in the frequency spectrum in a predetermined manner.

In a form of the fourth broad aspect of the invention the transmit electronics further having a module including a look-up table and a timer, wherein the module selects data points in the look-up table to generate at least one driving signal by setting the timer to appropriate frequencies.

In a form of the fourth broad aspect of the invention the receive electronics further includes band pass filters, wherein the frequency resolution of the rectangular wave generators is selected such that any spurious components present in the driving signal do not fall in either the pass band or the transition band of the receiver filters.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the description below in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Throughout this specification and the claims that follow unless the context requires otherwise, the words "comprise" and "include" and variations such as "comprising" and "including" will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge of the technical field.

BRIEF DESCRIPTION OF THE DRAWINGS

The detailed aspects and exemplification of the invention is made by FIG. 1, FIG. 2 and FIG. 3, where FIG. 1 provides a circuit for a transmitter for a metal detector using the half-bridge configuration of the invention, FIG. 2 uses a combination of two half-bridges and FIG. 3 uses a full-bridge configuration.

DETAILED DESCRIPTION OF THE INVENTION

Figure 1:
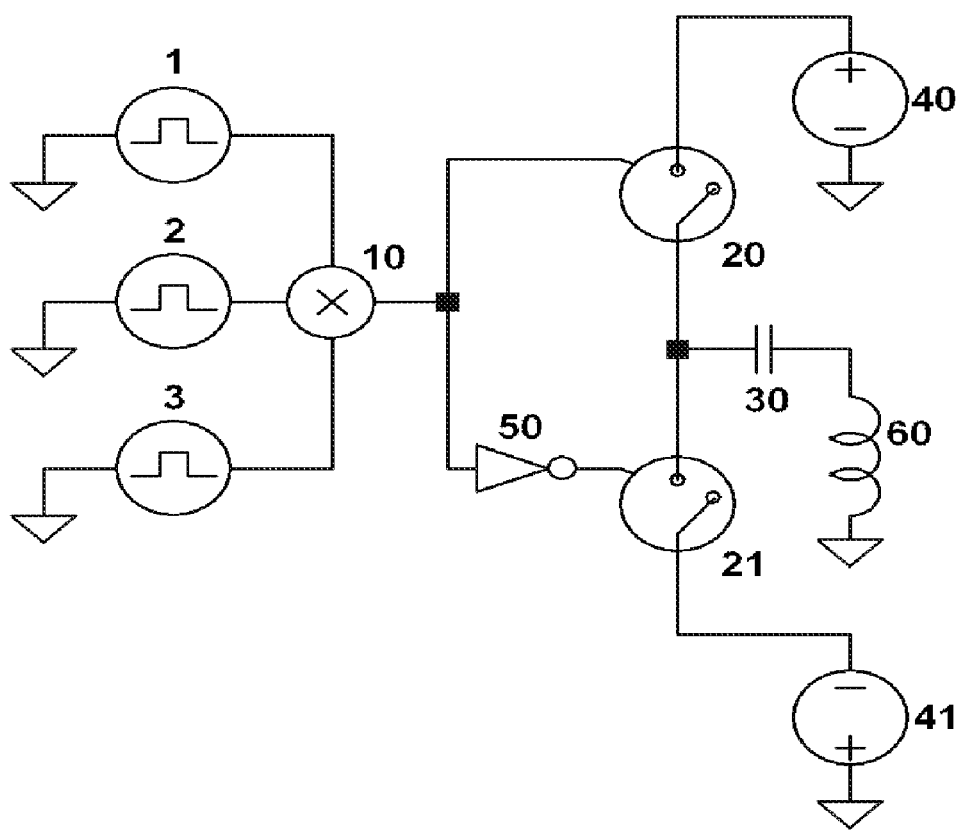

In a first embodiment of the invention and its simplest form, the multi-frequency transmitter consists of a half-bridge switching power stage driven with a digital input signal containing several strong Fourier transform components obtained by mixing two or three generating rectangular waves. The amplified output of the half-bridge switching power stage is then applied to a transmit winding. One example is given as FIG. 1 which will be discussed in detail later.

In a second embodiment of the invention, the multi-frequency transmitter consists of two independent half-bridge switching power stages, each driven with a separate digital input signal containing several strong Fourier transform components obtained by mixing two or three generating rectangular waves, respectively. One example is given as FIG. 2 which will be discussed in detail later.

In a third embodiment of the invention, the digital input signal described in the first embodiment above is applied to a full-bridge switching power stage. In this context the full-bridge consists of two half-bridges, one driven with the digital input signal and the other driven with the inverted digital input signal. Compared to the first embodiment, the third embodiment has the advantage that, for a given total power supply voltage, the output signal applied to the transmit winding is twice as large. The disadvantage of the third embodiment is that the circuit is more complex, requiring twice as many switches and driving circuits. One example is given as FIG. 3 which will be discussed in detail later.

For any of the three embodiments, by appropriately choosing the frequencies of the generating rectangular waves, the strong Fourier transform components of the digital input signal (or signals), and therefore of the amplified output signal applied to the transmit winding, can be approximately located in a linear progression on a logarithmic frequency scale (or in a geometric progression on a linear frequency scale).

In the following, the methods to create the digital input signals driving the half-bridge or full-bridge or independent half-bridges of the above embodiments are separately described for the cases of mixing two and respectively three generating rectangular waves. In both cases it is assumed that the frequencies of the strong Fourier transform components in the mixed signals ideally have the following relationship:

$$f_1, f_2 = kf_1, f_3 = k^2 f_1 \text{ etc} \quad \text{(Eq. 1)}$$

and that their magnitudes are comparable.

In general, mixing (through multiplication) two rectangular wave signals of frequencies $f_A$ and $f_B$ will result in a signal with Fourier transform components at frequencies given by $f = \text{abs}(\pm i f_A \pm j f_B)$, where abs( ) is the absolute value function and i, j are positive integers. If the duty cycle of the rectangular waves is close or equal to 50%, then the strong Fourier transform components of the signal will fall onto the following two frequencies: $f_{1,2} = \text{abs}(\pm f_A \pm f_B)$, which is the convolution of the fundamental frequencies of the rectangular wave signals of frequencies $f_A$ and $f_B$. Similarly, mixing three rectangular wave signals of frequencies $f_A$, $f_B$, and $f_C$ will result in an output signal with Fourier transform components at frequencies given by $f = \text{abs}(\pm i f_A \pm j f_B \pm k f_C)$; however, the strong Fourier transform components of the signal will fall onto four frequencies following the relationship: $f_{1,2,3,4} = \text{abs}(\pm f_A \pm f_B \pm f_C)$, which is the convolution of the fundamental frequencies of the rectangular wave signals of frequencies $f_A$, $f_B$ and $f_C$. The multitude of additional spurious signals resulting from the mixing of the harmonics in the generating rectangular waves have significantly lower magnitudes and can be ignored.

For creating a digital signal with strong Fourier transform components at two frequencies, $f_1$ and $f_2 = kf_1$, the two generating rectangular waves to be mixed must have the frequencies $$f_A = \frac{k-1}{2} f_1 \text{ and } f_B = \frac{k+1}{2} f_1.$$

The multiplicative factor k can have any numerical value (integer, rational or irrational).

For creating a digital signal with strong Fourier transform components at four frequencies, $f_1$, $f_2 = kf_1$, $f_3 = k^2 f_1$ and $f_4 = k^3 f_1$, the three generating rectangular waves to be mixed must have the frequencies $$f_A = \frac{k+1}{2} f_1, \quad f_B = \frac{k^2+1}{2} f_1 \text{ and } f_C = \frac{k(k+1)}{2} f_1.$$

However, in this case the multiplicative factor k cannot have any value but it must be equal to the tribonacci constant (1.8392867552 . . . ). This is a significant restriction, as it limits the ratio between the highest frequency ($f_4$) and the lowest frequency ($f_1$) to $k^3 = 6.22226252312 \ldots$.

In some cases it might be desirable to drive the transmit winding with a digital signal with strong Fourier transform components at four frequencies but without the above mentioned restriction on k. This can be achieved by using the second embodiment, where each half-bridge is driven with a digital signal with strong Fourier transform components at two frequencies. This gives an output signal with strong Fourier transform components at four frequencies, $f_1$, $f_2=kf_1$, $f_3=k^2f_1$ and $f_4=k^3f_1$. If the generating rectangular waves which are mixed to drive one half-bridge are $f_A$ and $f_B$, and those which are mixed to drive the other half-bridge are $f_C$ and $f_D$, then there are three options to obtain the frequencies $f_1$ to $f_4$.

In the first option $f_A$ and $f_B$ generate $f_1$ and $f_2$ while $f_C$ and $f_D$ generated $f_3$ and $f_4$. This requires $$f_A = \frac{k-1}{2}f_1, \quad f_B = \frac{k+1}{2}f_1,$$
$$f_C = \frac{k^2(k-1)}{2}f_1 \text{ and } f_D = \frac{k^2(k+1)}{2}f_1.$$

In the second option $f_A$ and $f_B$ generate $f_2$ and $f_3$ while $f_C$ and $f_D$ generate $f_1$ and $f_4$. This requires $$f_A = \frac{k(k-1)}{2}f_1, \quad f_B = \frac{k(k+1)}{2}f_1,$$
$$f_C = \frac{k^3-1}{2}f_1 \text{ and } f_D = \frac{k(k^2+1)}{2}f_1.$$

In the third option $f_A$ and $f_B$ generate $f_1$ and $f_3$ while $f_C$ and $f_D$ generate $f_2$ and $f_4$. This requires $$f_A = \frac{k^2-1}{2}f_1, \quad f_B = \frac{k^2+1}{2}f_1,$$
$$f_C = \frac{k(k^2-1)}{2}f_1 \text{ and } f_D = \frac{k(k^2+1)}{2}f_1.$$

Figure 5:
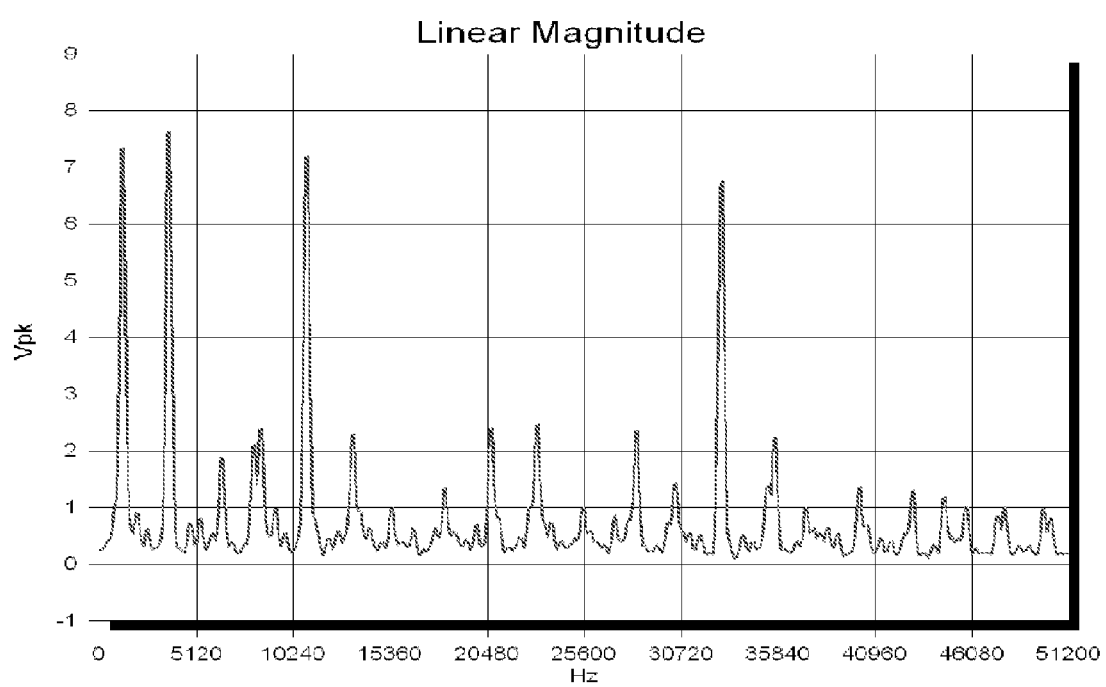
FIG. 5 illustrates the measured frequency spectrum produced by an actual implementation of the invention.
Figure 6:
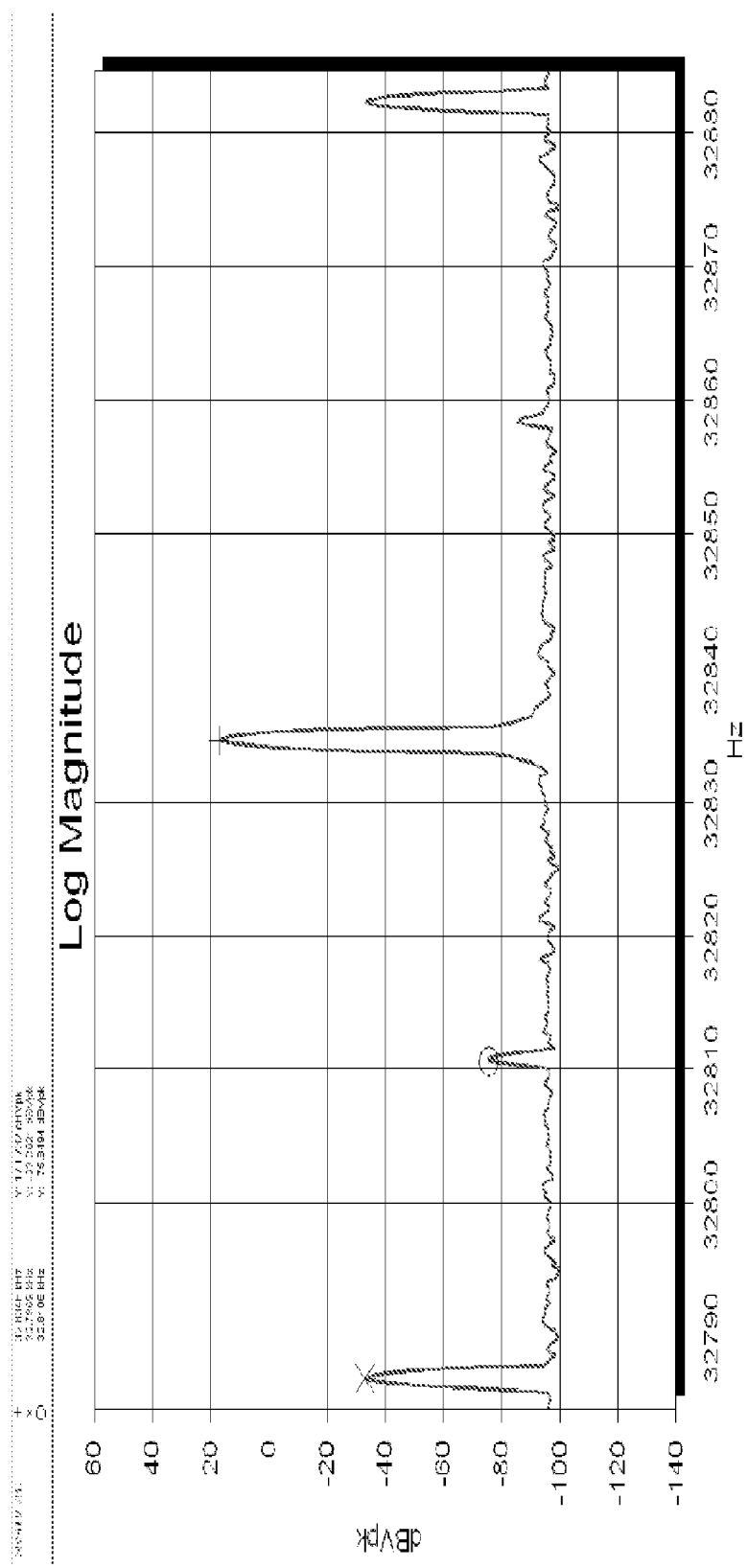
FIG. 6 is a detailed view of the measured frequency spectrum showing the separation of the spurious frequencies due to the phase truncation in the phase accumulator.

As an example, if we use the third option, choose each frequency to be k=3 times the previous one, $f_{i+1}=3f_i$, i=1, 2, 3, and if the lowest frequency is 1.216 kHz, then the transmitted frequencies are: $f_1$=1.216 kHz, $f_2$=3.647 kHz, $f_3$=10.943 kHz, $f_4$=32.830 kHz. In this case, the generating frequencies must be: $f_A$=4.864 kHz, $f_B$=6.080 kHz, $f_C$=14.591 kHz, $f_D$=18.239 kHz. FIGS. 5 and 6 show the spectra of the simulated and generated transmit signal using this example.

In some cases it might be desirable to drive the transmit winding with a digital signal with strong Fourier transform components at eight frequencies. This can be achieved by using the second embodiment, where each half-bridge is driven with a digital signal with strong Fourier transform components at four frequencies. This gives an output signal with strong Fourier transform components at eight frequencies, $f_1$, $f_2=kf_1$, $f_3=k^2f_1$, $f_4=k^3f_1$, $f_5=k^4f_1$, $f_6=k^5f_1$, $f_7=k^6f_1$ and $f_8=k^7f_1$. The generating rectangular waves which are mixed to drive one half-bridge are $$f_A = \frac{k+1}{2}f_1, \quad f_B = \frac{k^2+1}{2}f_1 \text{ and } f_C = \frac{k(k+1)}{2}f_1$$

and those which are mixed to drive the other half-bridge are $$f_D = \frac{k^4(k+1)}{2}f_1, \quad f_E = \frac{k^4(k^2+1)}{2}f_1 \text{ and } f_F = \frac{k^5(k+1)}{2}f_1.$$

As mentioned above, mixing three frequencies requires a particular value of k, but for eight frequencies the span is almost three orders of magnitude: $f_8/f_1 \approx 71.21084$.

Using the second embodiment it is also possible to combine the two methods, i.e. one half-bridge is driven with a digital signal obtained by mixing two generating rectangular waves, while the other half-bridge is driven with a digital signal obtained by mixing three generating rectangular waves. This would give an output signal with strong Fourier transform components at six frequencies. However, unless the half-bridge driven with a digital signal obtained by mixing two generating rectangular waves is supplied with half the voltage of the half-bridge driven with a digital signal obtained by mixing three generating rectangular waves, the amplitudes of the strong Fourier transform components in the output signal will not have comparable amplitudes.

It was previously mentioned that it is desirable to drive the transmit winding with signals whose frequencies are in a linear progression on a logarithmic frequency scale (or a geometric progression on a linear frequency scale), as illustrated by Eq. 1. This, in turn, requires that the generating frequencies $f_A$, $f_B$, $f_C$ etc are calculated by the formulae given above. However, small deviations from the requirement typified by Eq. 1 are acceptable and will not hamper the operation of the metal detector. Therefore, the values for the generating frequencies $f_A$, $f_B$, $f_C$ etc as calculated with the above formulae should be seen as ideal and small deviations from these values are acceptable.

Referring to FIG. 1, an arrangement is proposed for a metal detector using two or four transmitted frequencies and a half-bridge arrangement, as described in the first embodiment. In this figure, (1), (2) and (3) each represent a rectangular wave source with a fundamental frequency $f_A$, $f_B$, and $f_C$ respectively, as described above. The internal generation of the signals can be done in a variety of ways and will be discussed further in the document. The rectangular wave signals are mixed, typically by employing the XOR function (10) and used to drive the switches (20), (21) of the half-bridge arrangement to control the voltage across a transmit winding (60). Two voltage sources (40), (41) of equal voltage and opposite polarity are provided to avoid a DC component across the winding (60). An optional capacitor (30) to block a DC component in the transmit signal is provided, but can be omitted if no such DC component is present. Alternatively, if the capacitor (30) is provided, the voltage source (41) can be omitted and the lower end of the switch (21) connected directly to ground.

Figure 2:
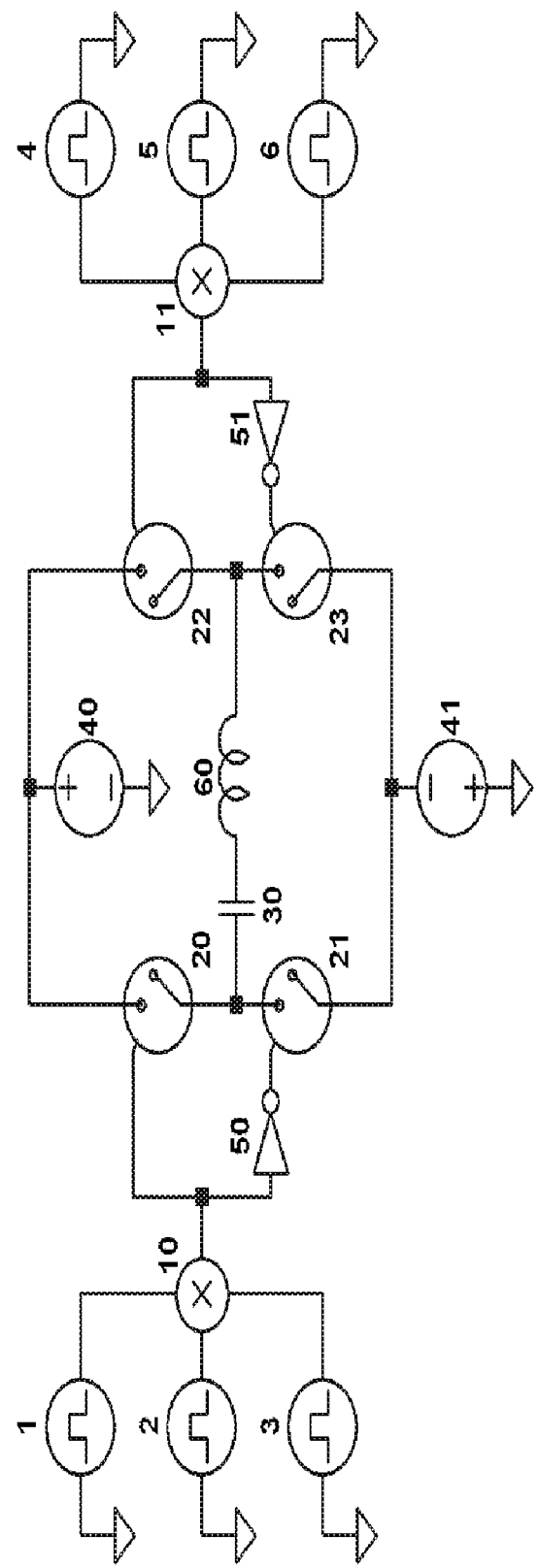
Figure 7:
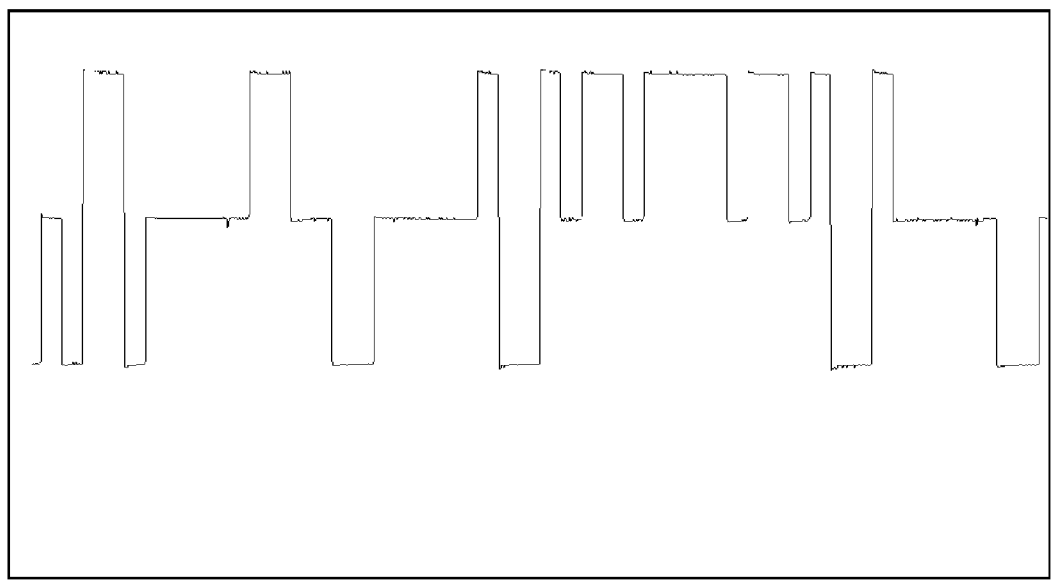
FIG. 7 demonstrates the measured time waveform produced by an actual implementation of the invention.

Referring to FIG. 2, a similar arrangement is proposed for a metal detector using four, six or eight transmitted frequencies and an arrangement of two independent half-bridges, as described in the second embodiment. Both ends of the transmit winding are controlled by independent switching signals and this will result in a three level signal across the transmit winding (as shown in FIG. 7) and the superposition of four, six or eight frequencies. The sources (1), (2) and (3) are similar to those in FIG. 1 and the sources (4), (5) and (6) each represent a rectangular wave source with a fundamental frequency $f_D$, $f_E$, and $f_F$ respectively, as described above. For this configuration the negative voltage source (41) can be omitted if desired and the common terminal of switches (21) and (23) connected directly to ground. As above, the optional capacitor (30) to block a DC component in the transmit signal is provided, but can be omitted if no such DC component is present.

Figure 3:
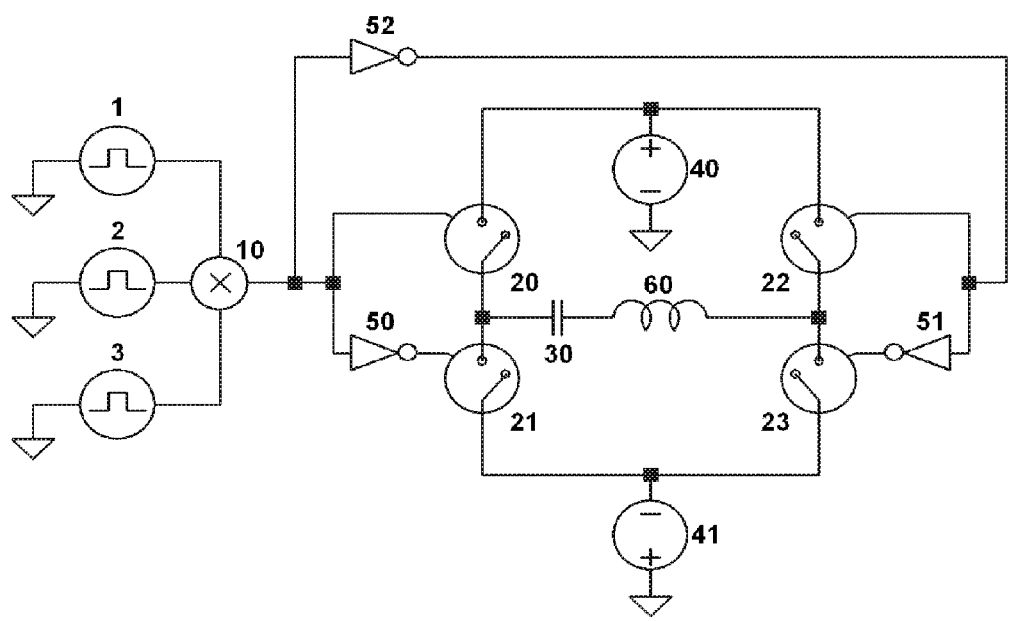

The full-bridge illustrated in FIG. 3 is an arrangement implementing the third embodiment. The input driving signal of the half-bridge switches (20), (21) is inverted by (52) and applied to the other half-bridge switches (22), (23). Thus, the two half-bridges are not switching independently, but always in complementary states.

In all arrangements proposed in FIGS. 1 to 3, if the rectangular wave source (3) of fundamental frequency $f_C$ and/or the rectangular wave source (6) of fundamental frequency $f_F$ are set to 0 frequency (fixed output signal, e.g. 1 or high), then those sources have essentially no effect on the operation of the circuit and the mixing of two frequencies applies ($f_A$ and $f_B$ and/or $f_D$ and $f_E$). Thus, the circuits of FIGS. 1 to 3 are suitable for two or three rectangular wave mixing or any combination thereof.

Generating the rectangular wave signals and/or the mixed driving signals can be done in a variety of ways with certain advantages and disadvantages.

A first approach would be to generate a transmit signal look-up table (LUT) that contains an integer number of periods of the mixed waveform. This arrangement would in essence combine (1), (2), (3), (10) in FIG. 1 into one block, or (1), (2), (3), (10), and (4), (5), (6), (11) in FIG. 2 into one block each. Different sets of frequencies can be generated by changing the clock frequency of the LUT, e.g. by using a programmable timer as the clock source. Limitations for this approach are: the available timer output frequency range, the length of the LUT, less flexibility in the choice of frequencies that can be generated and the difficulty of synchronising the transmitter and the digital receiver, based on a fixed ADC clock. However, this approach has the advantage that no spurious components will be generated in addition to those from the mixing process.

A second approach would be to use direct digital synthesis (DDS) with a phase accumulator to generate the individual rectangular wave signals before mixing them. This approach offers much more flexibility in the selection of frequencies and synchronisation between the transmitter and the digital receiver is easily accomplished. However, using the DDS approach will result in spurious signals due to phase truncations in the phase accumulators.

The spacing of the spurious components $\Delta f$ due to the phase truncations in the phase accumulator of a DDS can be described as $$\Delta f = f_{clk} * \frac{gcd(M, 2^N)}{2^N} \quad \text{(Eq. 2)}$$

where $f_{clk}$ stands for the clock frequency of the DDS, gcd stands for the greatest common divisor function, N is the bit-length of the phase accumulator and M is the chosen divisor in the range of 1 to $2^{N-1}$. For $M=2^L$, where L is in the range of 0 to N−1, no spurious components will be generated; however, the choice of frequencies is limited to N and in general not sufficient.

When designing the DDS, the given design parameters, clock frequency and N are chosen, such that the receiver operation is not affected by the spurious signals generated due to the phase truncations. In order to achieve this goal, the spurious components need to be either
- placed to fall outside of the receiver filter pass band and transition band, or
- be of sufficiently low amplitude so that they do not interfere with the signal of interest, if they fall inside the receiver filter pass band.

Typically, in a metal detection device, the required spurious free frequency range is relatively small due to the very narrow receiver filter pass band, which rejects out-of-band signals. Furthermore, receiver and transmitter frequencies are typically generated from the same clock source and are therefore locked tightly in phase and frequency.

For example, choosing a clock frequency of 100 kHz and a phase accumulator of length N=12, the worst-case spurious signal would be separated from the fundamental frequency by more than 24 Hz. If the receiver filter is narrower than 24 Hz, the spurious components can be sufficiently rejected and are of no concern for the detector's operation. Note that choosing a smaller N would increase the spurious-free range; however, it would also reduce the granularity for the frequency generation and a trade-off has to be found between the needed granularity, the band width of the receiver filter and the required spurious-free dynamic range.

Signal energy in spurious components, which fall outside the receiver filter pass band, does not contribute to the detection of targets. However, it would be possible to utilize this energy by adding additional receiver channels that would detect on the spurious signal frequencies. Typically, the power in these spurious components is much lower, and the signal-to-noise ratio therefore much smaller; nevertheless those additional receive signals can provide further information on the target to detect.

Figure 4:
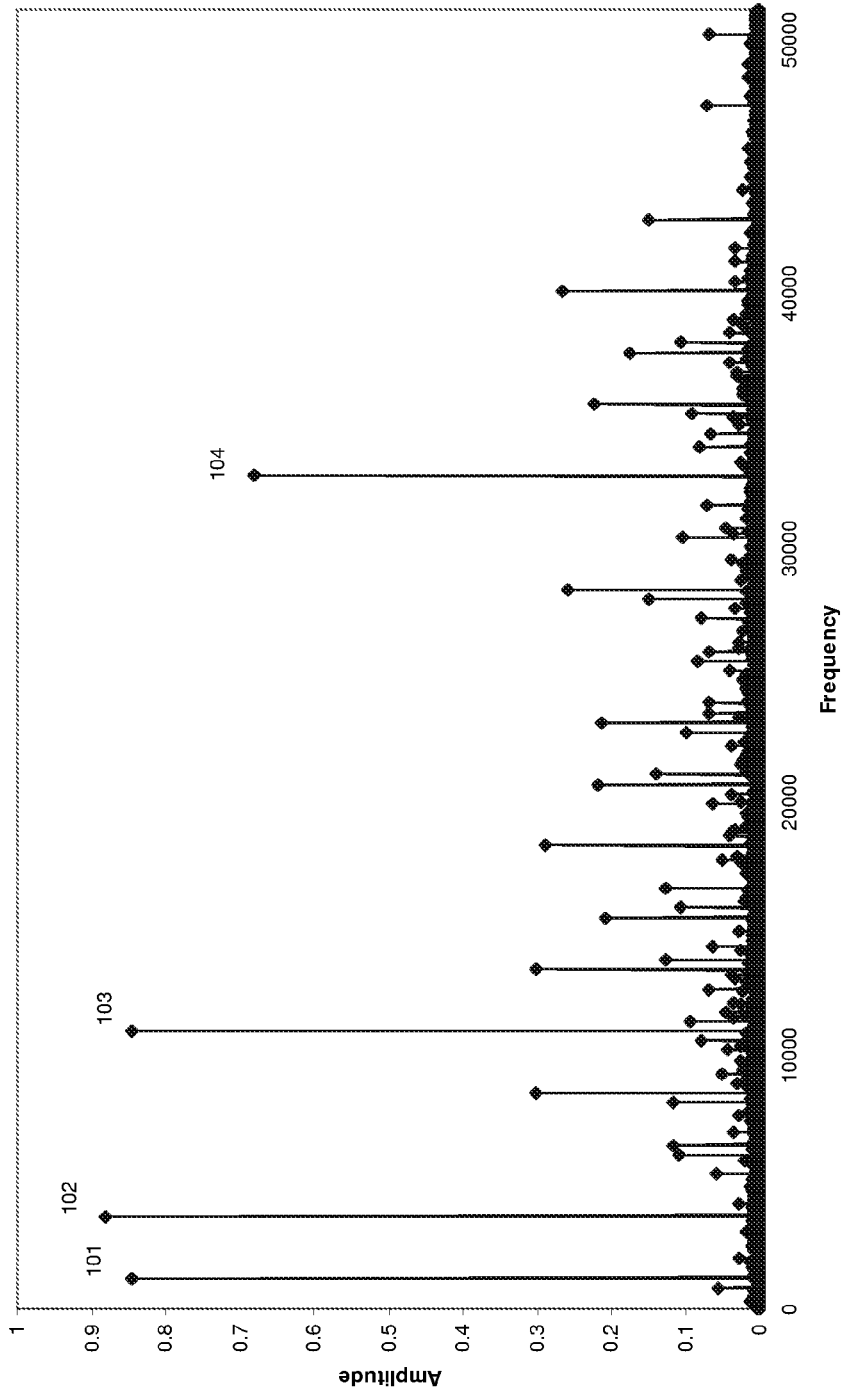
FIG. 4 is a graphical representation of the calculated frequency spectrum of a 4-frequency transmitter implemented according to the present invention.

For example, a typical frequency spectrum of the transmitted signal is shown in FIG. 4, where (101), (102), (103) and (104) are the desired transmit frequencies. Additional receive channels could be used to detect target responses on the stronger spurious frequencies.

Amplitude control for the individual transmit signals with the proposed algorithm is not directly attainable. In certain cases, depending on the selected frequencies, limited control over the amplitudes of the transmitted signal and the harmonics can be obtained by phase shifting the individual rectangular waveforms or altering their duty cycle before mixing.

The implementation of the newly proposed transmitter can for example be done on an off-the shelf digital signal processor or a programmable logic device and requires little processing overhead and a 1-bit LUT (comparator function).

A metal detector with a four-frequency switching transmitter has been designed, constructed and tested. The transmitter consists of two independently driven half-bridges differentially connected to the transmit winding. An example of a transmitted waveform, as measured with an oscilloscope across the transmit winding, is shown in FIG. 7. The frequency spectrum of this waveform is shown in FIG. 5 as it was measured with an FFT dynamic spectrum analyser. It can be seen that it is very similar to the calculated spectrum, shown in FIG. 4. An expanded view of the frequency range close to one of the transmitted frequencies (f4) is presented in FIG. 6 and it shows that the spurious components are equally spaced by 23.8 Hz. As the receiver of the metal detector implements the methods disclosed in the patent WO2006/021045 and the low pass filters following demodulation have a stop band of 23.8 Hz with 120 dB attenuation, there is no possibility of false signals due to any of the spurious signals. This is consistent with the method selected for generating the transmit signals, with spurious components falling outside the receiver pass band.

The invention claimed is:

1. A method for generating a transmit signal for transmission including the steps of:
    generating a first group of at least two selected rectangular wave signals, each having a different fundamental frequency;
    mixing the first group of at least two selected rectangular wave signals to produce a first driving signal; and
    driving a first switching circuit using the first driving signal for generating a first transmit signal for transmission, wherein a Fourier transform of the first transmit signal contains frequency components of relatively high magnitude, at frequencies corresponding to a convolution of the different fundamental frequency of each of the first group of at least two selected rectangular wave signals, as compared to other frequency components across a frequency spectrum of the Fourier transform of the first transmit signal, and wherein the first group of at least two rectangular wave signals are selected such that the frequency components of relatively high magnitude are substantially the same in magnitude, and spaced from each other in a predetermined manner 2. A method according to claim 1, wherein the first switching circuit is a half-bridge and wherein the first group of at least two selected rectangular wave signals includes:
 a first signal having a first fundamental frequency $f_A$;
 a second signal having a second fundamental frequency $f_B$; and
 a third signal having a third fundamental frequency $f_C$;
wherein the Fourier transform of the first transmit signal includes four frequency components of relatively high magnitude at frequencies $f_1$, $f_2$, $f_3$ and $f_4$, and the four frequency components are substantially linearly-spaced in a logarithmic scaled frequency spectrum.

3. A method according to claim 2, wherein $f_A$, $f_B$ and $f_C$ are substantially determined through the relationship of $$f_A = \frac{k+1}{2}f_1,$$
$$f_B = \frac{k^2+1}{2}f_1, \text{ and}$$
$$f_C = \frac{k(k+1)}{2}f_1,$$

where k is the tribonacci constant, and $f_1$, is the lowest frequency among $f_1$, $f_2$, $f_3$ and $f_4$.

4. A method according to claim 1, further including the steps of:
 generating a second group of at least two selected rectangular wave signals, each having a different fundamental frequency;
 mixing the second group of at least two selected rectangular wave signals to produce a second driving signal; and
 driving a second switching circuit using the second driving signal for generating a second transmit signal for transmission, wherein a Fourier transform of the second transmit signal contains frequency components of relatively high magnitude, at frequencies corresponding to a convolution of the different fundamental frequency of each of the second group of at least two selected rectangular wave signals, as compared to other frequency components across a frequency spectrum of the Fourier transform of the second transmit signal, and wherein the second group of at least two rectangular wave signals are selected such that the frequency components of relatively high magnitude of the first and second transmit signals are substantially the same in magnitude, and spaced from each other in a predetermined manner.

5. A method according to claim 4, wherein
 the first group of at least two selected rectangular wave signals includes:
  a first signal having a first fundamental frequency $f_A$; and
  a second signal having a second fundamental frequency $f_B$;
 the second group of at least two selected rectangular wave signals includes:
  a third signal having a third fundamental frequency $f_C$; and
  a fourth signal having a fourth fundamental frequency $f_D$;
and wherein the Fourier transform of the first transmit signal includes two frequency components of relatively high magnitude at frequencies $f_1$ and $f_2$; and the Fourier transform of the second transmit signal includes two frequency components of relatively high magnitude at frequencies $f_3$ and $f_4$, and all four frequency components are substantially linearly-spaced in a logarithmic scaled frequency spectrum; and
$f_A$, $f_B$, $f_C$ and $f_D$ are substantially determined through the relationship of $$f_A = \frac{k-1}{2}f_1, \quad f_B = \frac{k+1}{2}f_1,$$
$$f_C = \frac{k^2(k-1)}{2}f_1, \text{ and } f_D = \frac{k^2(k+1)}{2}f_1,$$

where k is any numerical value, and $f_1$ is the lowest frequency among $f_1$, $f_2$, $f_3$ and $f_4$.

6. A method according to claim 4, wherein
 the first group of at least two selected rectangular wave signals includes:
  a first signal having a first fundamental frequency $f_A$; and
  a second signal having a second fundamental frequency $f_B$;
 the second group of at least two triangular wave signals includes:
  a third signal having a third fundamental frequency $f_C$; and
  a fourth signal having a fourth fundamental frequency $f_D$;
and wherein the Fourier transform of the first transmit signal includes two frequency components of relatively high magnitude at frequencies $f_2$ and $f_3$; and the Fourier transform of the second transmit signal includes two frequency components of relatively high magnitude at frequencies $f_1$ and $f_4$, and all four frequency components are substantially linearly-spaced in a logarithmic scaled frequency spectrum; and
$f_A$, $f_B$, $f_C$ and $f_D$ are substantially determined through the relationship of $$f_A = \frac{k(k-1)}{2}f_1, \quad f_B = \frac{k(k+1)}{2}f_1,$$
$$f_C = \frac{k^3-1}{2}f_1, \text{ and } f_D = \frac{k^3+1}{2}f_1,$$

where k is any numerical value, and $f_1$ is the lowest frequency among $f_1$, $f_2$, $f_3$ and $f_4$.

7. A method according to claim 4, wherein
 the first group of at least two selected rectangular wave signals includes:
  a first signal having a first fundamental frequency $f_A$; and
  a second signal having a second fundamental frequency $f_B$;
 the second group of at least two selected rectangular wave signals includes:
  a third signal having a third fundamental frequency $f_C$; and
  a fourth signal having a fourth fundamental frequency $f_D$;

and wherein the Fourier transform of the first transmit signal includes two frequency components of relatively high magnitude at frequencies $f_1$ and $f_3$; and the Fourier transform of the second transmit signal includes two frequency components of relatively high magnitude at frequencies $f_2$ and $f_4$, and all four frequency components are substantially linearly-spaced in a logarithmic scaled frequency spectrum; and $f_A$, $f_B$, $f_C$ and $f_D$ are substantially determined through the relationship of $$f_A = \frac{k^2 - 1}{2} f_1, \quad f_B = \frac{k^2 + 1}{2} f_1,$$
$$f_C = \frac{k(k^2 - 1)}{2} f_1, \quad \text{and} \quad f_D = \frac{k(k^2 + 1)}{2} f_1,$$

where k is any numerical value, and $f_1$ is the lowest frequency among $f_1$, $f_2$, $f_3$ and $f_4$.

8. A method according to claim 4, wherein
the first group of at least two selected rectangular wave signals includes:
  a first signal having a first fundamental frequency $f_A$;
  a second signal having a second fundamental frequency $f_B$; and
  a third signal having a third fundamental frequency $f_C$;
the second group of at least two selected rectangular wave signals includes:
  a fourth signal having a fourth fundamental frequency $f_D$;
  a fifth signal having a fifth fundamental frequency $f_E$; and
  a sixth signal having a sixth fundamental frequency $f_F$;
and wherein the Fourier transform of the first transmit signal includes four frequency components of relatively high magnitude at four different frequencies; and the Fourier transform of the second transmit signal includes four frequency components of relatively high magnitude at four other frequencies, and all eight frequency components are substantially linearly-spaced in a logarithmic scaled frequency spectrum.

9. A method according to claim 4 wherein
the first group of at least two selected rectangular wave signals includes:
  a first signal having a first fundamental frequency $f_A$;
  a second signal having a second fundamental frequency $f_B$; and
  a third signal having a third fundamental frequency $f_C$;
the second group of at least two selected rectangular wave signals includes:
  a fourth signal having a fourth fundamental frequency $f_D$ and
  a fifth signal having a fifth fundamental frequency $f_E$;
and wherein the Fourier transform of the first transmit signal includes four frequency components of relatively high magnitude at four different frequencies; and the Fourier transform of the first transmit signal includes two frequency components of relatively high magnitude at two other frequencies, and all six frequency components are substantially linearly-spaced in a logarithmic scaled frequency spectrum.

10. An apparatus for generating a transmit signal for transmission including
at least one generator to generate at least two selected rectangular wave signals, each of the at least two selected rectangular wave signals having a different fundamental frequency;
at least one mixer to mix the at least two selected rectangular wave signals to produce a driving signal; and
at least one switching circuit for receiving the driving signal to generate a transmit signal for transmission, a Fourier transform of the transmit signal contains frequency components of relatively high magnitude at frequencies corresponding to a convolution of the different fundamental frequency of each of the at least two selected rectangular wave signals as compared to other frequency components across a frequency spectrum of the Fourier transform, and wherein the at least two selected rectangular wave signals are selected such that the frequency components of relatively high magnitude are substantially the same in magnitude, and spaced from each other in a predetermined manner.

11. A metal detector used for detecting metallic targets including:
rectangular wave generators for generating at least two rectangular wave signals, each having a different fundamental frequency;
transmit electronics for mixing the at least two rectangular wave signals to produce at least one driving signal for driving a plurality of switches to generate a transmit signal;
a transmit coil connected to the transmit electronics for receiving the transmit signal and generating a transmitted magnetic field for transmission;
at least one receive coil for receiving a received magnetic field and providing a received signal induced by the received magnetic field; and
receive electronics connected to the at least one receive coil for processing the received signal to produce an indicator output signal, the indicator output signal including a signal indicative of the presence of a metallic target in the soil;
wherein a Fourier transform of the transmit signal contains frequency components of relatively high magnitude, at frequencies corresponding to a convolution of the different fundamental frequency of each of the at least two rectangular wave signals, as compared to other frequency components across a frequency spectrum of the Fourier transform, and wherein the at least two rectangular wave signals are selected such that the frequency components of relatively high magnitude are substantially the same in magnitude, and spaced from each other in a predetermined manner.

12. A metal detector according to claim 11, wherein the transmit electronics further includes a module having a look-up table and a timer, wherein the module selects data points in the look-up table to generate the at least one driving signal by setting the timer to appropriate frequencies.

13. A metal detector according to claim 11, wherein the receive electronics further includes band pass filters, wherein a frequency resolution of the rectangular wave generators is selected such that any spurious components present in the at least one driving signal does not fall in a pass band or a transition band of the receive electronics.

14. A method according to claim 1, wherein the first switching circuit is a full-bridge with two inputs, a first input for receiving the first driving signal, and a second input for receiving an inverted first driving signal.

15. A method according to claim 4, wherein the first switching circuit is a half-bridge connected to one side of a transmitter, and the second switching circuit is another half-bridge connected to another side the transmitter.

* * * * *